(12) United States Patent
Murakami et al.

(10) Patent No.: US 11,904,407 B2
(45) Date of Patent: Feb. 20, 2024

(54) LASER WELDING APPARATUS

(71) Applicant: FANUC CORPORATION, Yamanashi (JP)

(72) Inventors: Yoshinori Murakami, Yamanashi (JP); Satoru Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 459 days.

(21) Appl. No.: 17/023,962

(22) Filed: Sep. 17, 2020

(65) Prior Publication Data

US 2021/0138585 A1    May 13, 2021

(30) Foreign Application Priority Data

Nov. 13, 2019  (JP) .................................. 2019-205328

(51) Int. Cl.
| | |
|---|---|
| *B23K 26/21* | (2014.01) |
| *B23K 26/14* | (2014.01) |
| *B23K 26/142* | (2014.01) |

(52) U.S. Cl.
CPC .......... *B23K 26/21* (2015.10); *B23K 26/1462* (2015.10); *B23K 26/142* (2015.10)

(58) Field of Classification Search
CPC .. B23K 26/142; B23K 26/1462; B23K 26/21; B23K 26/14
USPC ............. 219/121.63, 121.69, 121.68, 121.84
See application file for complete search history.

(56) References Cited

U.S. PATENT DOCUMENTS

| | | | | |
|---|---|---|---|---|
| 5,424,508 A | * | 6/1995 | Swain ................. | B23K 26/147 |
| | | | | 219/121.84 |
| 2002/0195431 A1 | * | 12/2002 | Rippl .................... | B23K 26/14 |
| | | | | 219/121.5 |
| 2005/0206894 A1 | | 9/2005 | Fukuda et al. | |
| 2007/0210040 A1 | | 9/2007 | Sakamoto et al. | |
| 2018/0017880 A1 | * | 1/2018 | Yoo .................. | H01L 21/67115 |
| 2018/0345406 A1 | | 12/2018 | Nakamura et al. | |
| 2019/0118291 A1 | * | 4/2019 | Nakagawa ........... | B23K 26/123 |
| 2019/0151945 A1 | | 5/2019 | Okazaki | |

FOREIGN PATENT DOCUMENTS

| | | | |
|---|---|---|---|
| EP | 1 832 380 A1 | 9/2007 | |
| EP | 3 412 401 A1 | 12/2018 | |
| JP | 59223191 A * | 12/1984 | ............ B23K 26/14 |
| JP | H04-135615 A | 5/1992 | |

(Continued)

OTHER PUBLICATIONS

Machine translation of JP-2002192374-A, Sep. 2023.*

(Continued)

*Primary Examiner* — Geoffrey S Evans
(74) *Attorney, Agent, or Firm* — Maier & Maier, PLLC (57) ABSTRACT

A laser welding apparatus is equipped with a laser head that emits a laser beam and an airflow forming unit that forms sheet-shaped airflows, in which the airflows formed by the airflow forming unit traverse an optical path of the laser beam emitted from the laser head, the airflows traversing the optical path at multiple positions which are spaced from each other in a direction along the optical path in a same direction. The airflow forming unit has an opening between the airflows at the multiple positions, the opening penetrating in a direction in which the airflows traverse the optical path.

7 Claims, 9 Drawing Sheets

(56) References Cited

FOREIGN PATENT DOCUMENTS

| | | | | |
|---|---|---|---|---|
| JP | 11267874 A | * | 10/1999 | |
| JP | 2000263276 A | * | 9/2000 | ......... B23K 26/1476 |
| JP | 2002192374 A | * | 7/2002 | |
| JP | 2007-268610 A | | 10/2007 | |
| JP | 4840110 B2 | | 12/2011 | |
| JP | 2014097906 A | * | 5/2014 | ............. B23K 26/00 |
| JP | 2014200827 A | | 10/2014 | |
| JP | 2015-120138 A | | 7/2015 | |
| JP | 2017100170 A | | 6/2017 | |
| JP | 2018-202441 A | | 12/2018 | |
| JP | 2019-094515 A | | 6/2019 | |

OTHER PUBLICATIONS

Machine translation of JP-2000263276-A, Sep. 2023.*

"Stratified airflow generator: Line Blow750 Series" from Product catalog, p. 14, Sanwa Enterprise, Ltd., Saitama, Japan,Retrieved from the Internet; URL: https://www.sanwa-ent.co.jp/sanwahps/datasheet/air/lblow.pdf; Retrieved from the Internet in Jul. 2019; 3 pages including Machine-generated English-language Translation.

* cited by examiner

LASER WELDING APPARATUS

CROSS-REFERENCE TO RELATED APPLICATIONS

This application is based on Japanese Patent Application No. 2019-205328, the content of which is incorporated herein by reference.

FIELD

The present disclosure relates to a laser welding apparatus.

BACKGROUND

There is known a laser welding apparatus equipped with a laser processing head that radiates a laser beam toward a workpiece, and multiple fluid emitting nozzles that emit airflows at different emission pressures in a direction parallel to a surface of a protection glass of the laser processing head (for example, Japanese Patent No. 4840110). A deflector plate is provided so that the directions of the airflows emitted from the fluid emitting nozzles are deflected back toward the fluid emitting nozzles from the direction parallel to the surface of the protection glass.

SUMMARY

An aspect of the present disclosure is directed to a laser welding apparatus that includes a laser head that emits a laser beam; and an airflow forming unit that forms sheet-shaped airflows. The airflows formed by the airflow forming unit traverse an optical path of the laser beam emitted from the laser head, the airflows traversing the optical path at multiple positions, which are spaced from each other in a direction along the optical path, in a same direction. The airflow forming unit has an opening between the airflows at the multiple positions, the opening penetrating in a direction in which the airflows traverse the optical path.

DETAILED DESCRIPTION OF EMBODIMENTS

A laser welding apparatus 1 according to an embodiment of the present disclosure will now be described with reference to the drawings.

Figure 1:
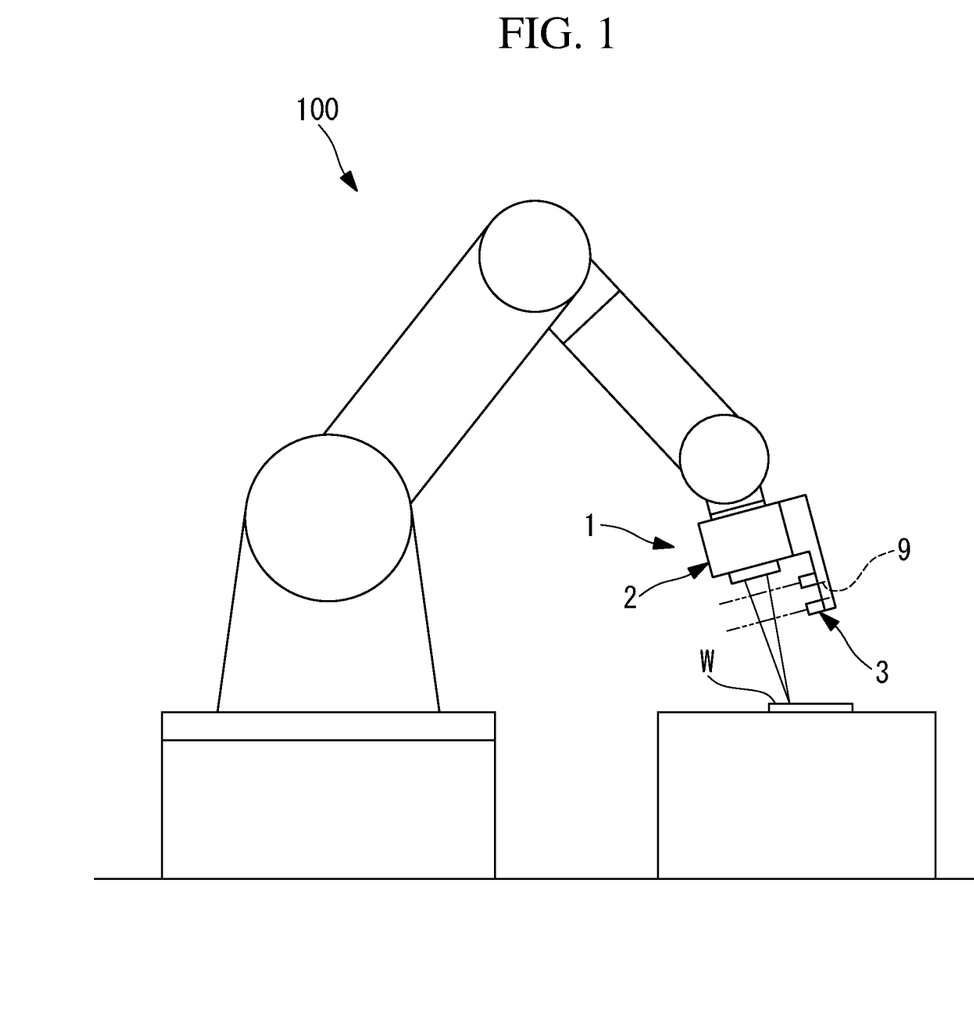
FIG. 1 is a schematic diagram of a robot on which is mounted a laser welding apparatus according to one embodiment of the present disclosure.

As illustrated in FIG. 1, the laser welding apparatus 1 of this embodiment is attached to a tip of a wrist of a robot 100. The laser welding apparatus 1 is equipped with a laser scanner (laser head) 2 and an airflow forming unit 3 that is fixed to the laser scanner 2 and forms airflows. In the example illustrated in FIG. 1, the robot 100 is a standing articulated robot.

The laser scanner 2 has a casing 4, and two galvanometer mirrors (not illustrated) that two-dimensionally scan the laser beam guided via an optical fiber cable 5 are installed inside the casing 4. The laser scanner 2 focuses the laser beam on a surface of a workpiece W disposed at a position remote from the casing 4, and adjust the angles of the galvanometer mirrors so that the laser beam focus position can be two-dimensionally moved in a direction intersecting the optical axis X. The casing 4 is hermetically sealed with a protection glass 6 that transmits the laser beam.

The airflow forming unit 3 is equipped with two emission nozzles 7. The emission nozzles 7 are fixed to the laser scanner 2 with a frame member 8.

Figure 2:
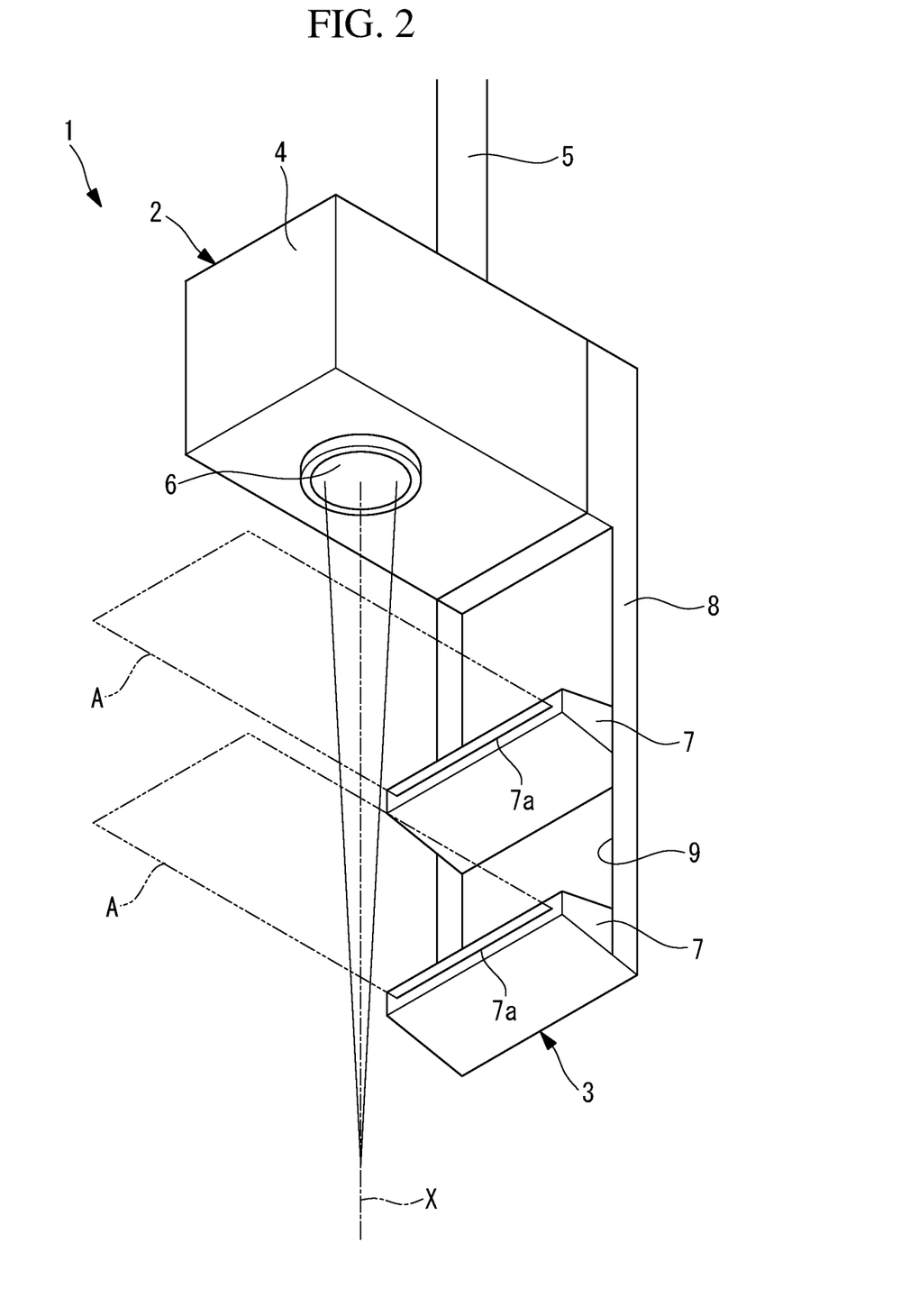
FIG. 2 is a perspective view of the laser welding apparatus illustrated in FIG. 1.

As illustrated in FIG. 2, each of the emission nozzles 7 has a sufficiently thin (about 0.1 mm or less) slit-shaped emission port 7a and generates a sheet-shaped airflow (laminar flow) A that extends along a flat plane.

The two emission nozzles 7 are arranged to be spaced from each other in a direction along the optical path of the laser beam emerging from the laser scanner 2. The two emission nozzles 7 are disposed on one side of the optical path of the laser beam and face in the same direction with the emission ports 7a arranged to be parallel to each other. The emission nozzles 7 form airflows that have about the same strength, that are parallel to each other, and that traverse the optical path of the laser beam in the same direction at two positions that are spaced from each other in a direction along the optical path.

An opening 9 penetrating in the direction of the airflows A is formed between the two emission nozzles 7 that are arranged to be spaced from each other in the direction along the optical path of the laser beam.

The operation of the laser welding apparatus 1 of this embodiment having the aforementioned features will now be described.

In order to weld a workpiece W by using the laser welding apparatus 1 of the present embodiment, the robot 100 is actuated to position the laser scanner 2 so that the laser beam focus position is on a surface of the workpiece W. Then, airflows A are formed by the airflow forming unit 3, a laser beam is guided via the optical fiber cable 5 into the laser scanner 2, and the laser scanner 2 is actuated to move the laser beam focus position along a weld line.

As a result, the workpiece W is welded, and spattering and fumes are generated.

Here, since the two sheet-shaped airflows A traversing the optical path of the laser beam are formed by actuating the airflow forming unit 3, the generated spattering and fumes are removed from the optical path of the laser beam due to the airflows.

Figure 3:
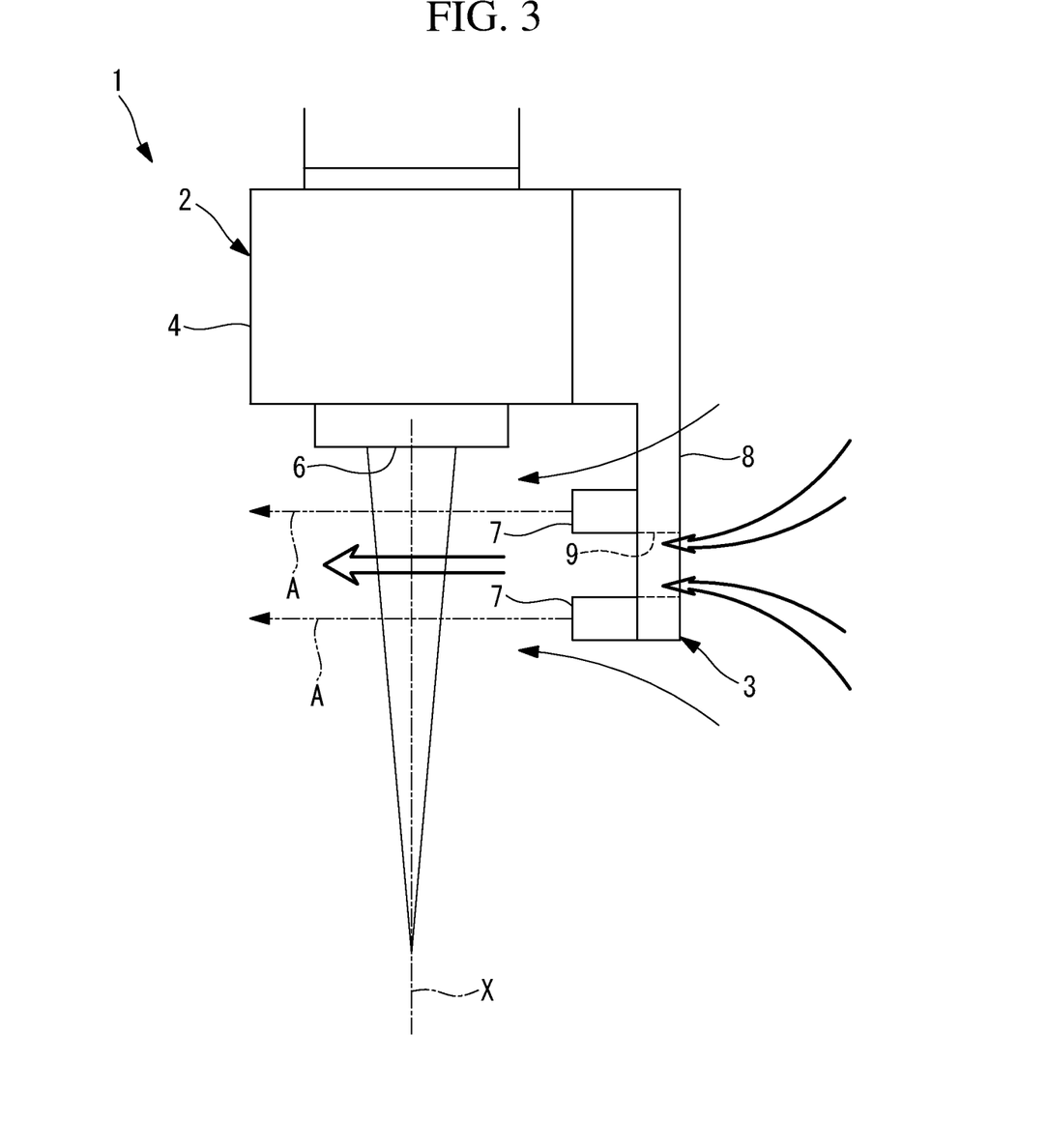
FIG. 3 is a side view illustrating the operation of the laser welding apparatus illustrated in FIG. 1.

According to the laser welding apparatus 1 of this embodiment, since the sheet-shaped airflows A are formed by the emission nozzles 7 of the airflow forming unit 3, as illustrated in FIG. 3, the air around the sheet-shaped airflows A is entrained due to the Coandă effect, and the air volume of the airflows A can be increased.

In particular, in this embodiment, since the two sheet-shaped airflows A are spaced from each other, a synergy occurs between the Coandă effects respectively generated from the two airflows A. As a result, more air is entrained between the two sheet-shaped airflows A through the opening 9, and the air volume of the airflows A can be further increased.

In other words, lightweight and compact emission nozzles 7 that form sheet-shaped airflows A can form airflows having a larger air volume than the total of the air volumes that can be emitted from the respective emission nozzles 7.

This offers an effect in that the generated spattering and fumes can be more reliably removed from the optical path of the laser beam.

Figure 4:
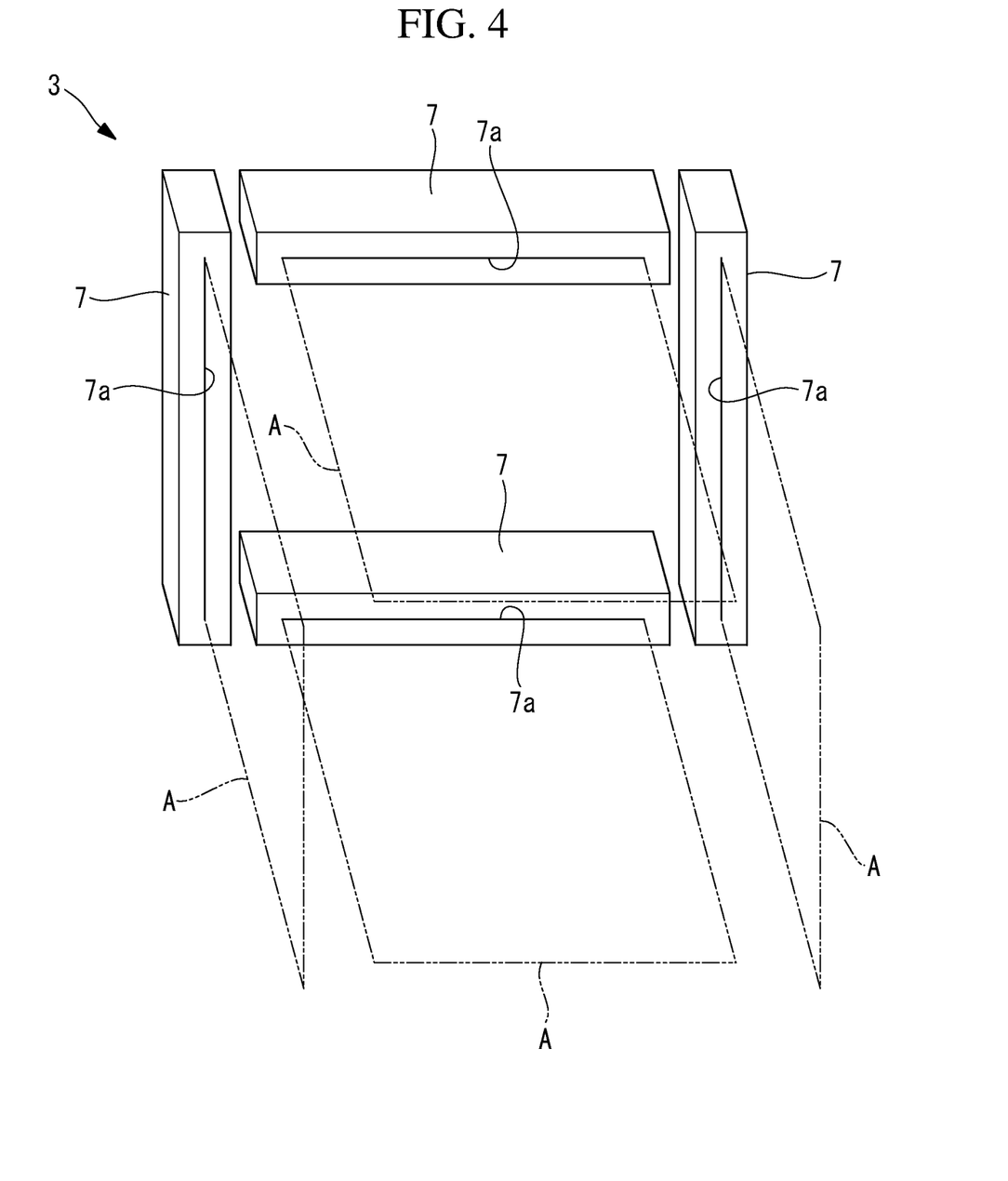
FIG. 4 is a perspective view of a modification of an airflow forming unit of the laser welding apparatus illustrated in FIG. 1.

In this embodiment, an airflow forming unit 3 that has two emission nozzles 7 is described as an example; alternatively, as illustrated in FIG. 4, an airflow forming unit 3 that has three or more emission nozzles 7 may be employed. In the example illustrated in FIG. 4, four emission nozzles 7 generate four sheet-shaped airflows A to form a rectangular tube-shaped airflow that surrounds the opening 9.

In this manner, due to the Coandă effects of the four sheet-shaped airflows A, more air than what is entrained in the airflow forming unit 3 illustrated in FIG. 2 is entrained from the opening 9 into the inside of the rectangular tube-shaped airflow surrounded by the four sheet-shaped airflows A, and an airflow having a large air volume can be generated.

In order to form a tube-shaped airflow, three or more emission nozzles 7 that form sheet-shaped airflows A along flat planes may be provided.

Figure 5:
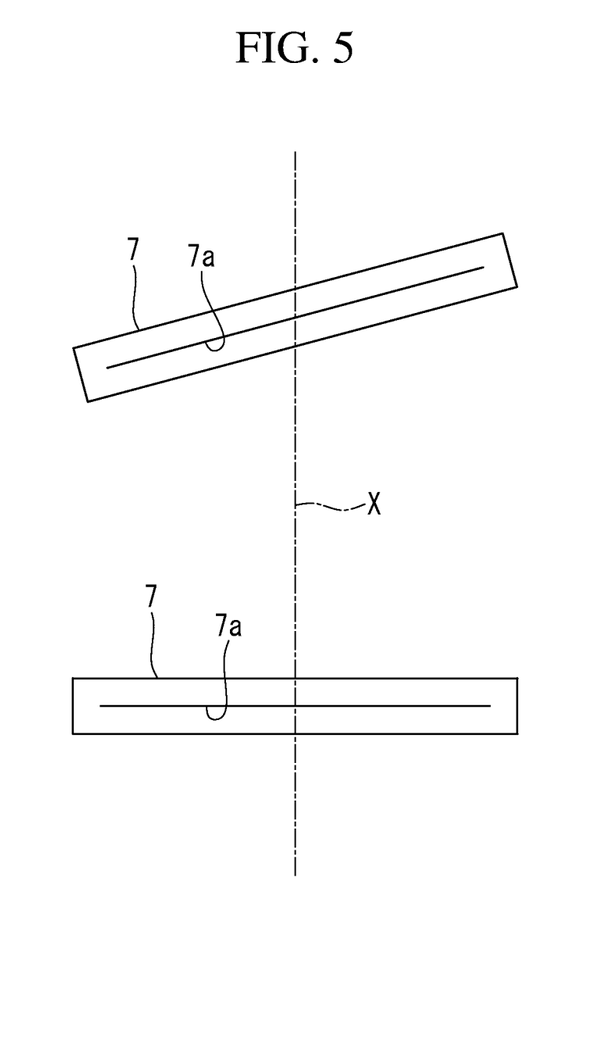
FIG. 5 is a front view of another modification of the airflow forming unit of the laser welding apparatus illustrated in FIG. 1.
Figure 6:
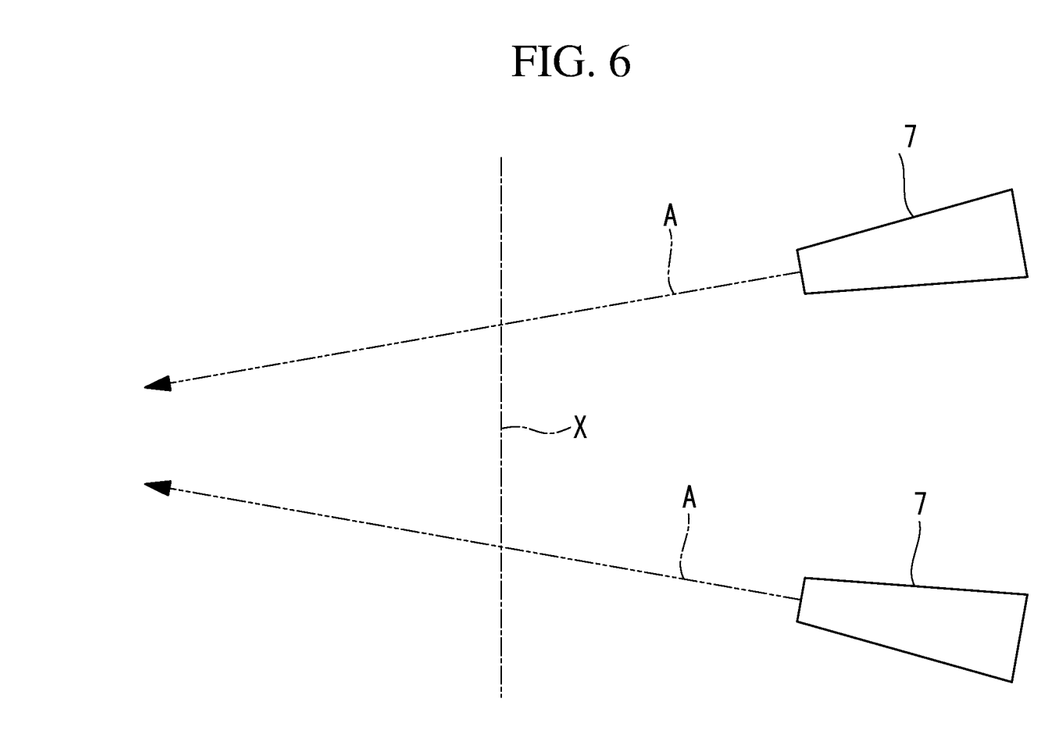
FIG. 6 is a side view illustrating another modification of the airflow forming unit of the laser welding apparatus illustrated in FIG. 1.

In this embodiment, two sheet-shaped airflows A are arranged to be substantially parallel to each other; alternatively, the two airflows A may be arranged to form an angle with each other as long as the airflows A traverse, in the same direction, the optical path of the laser beam at two positions spaced from each other in the direction along the optical path of the laser beam. For example, the airflows may have different angles about the axis along the flowing direction as illustrated in FIG. 5, or may have different angles about the axis intersecting the flowing direction as illustrated in FIG. 6.

In this embodiment, an example in which the emission nozzles 7 form sheet-shaped airflows A along flat planes is described; alternatively, an emission nozzle 10 that forms a curved or bent sheet-shaped airflow B may be employed. According to the airflow B of this mode, a tube-shaped airflow can be formed by using one closed ring-shaped emission nozzle 10.

Figure 7:
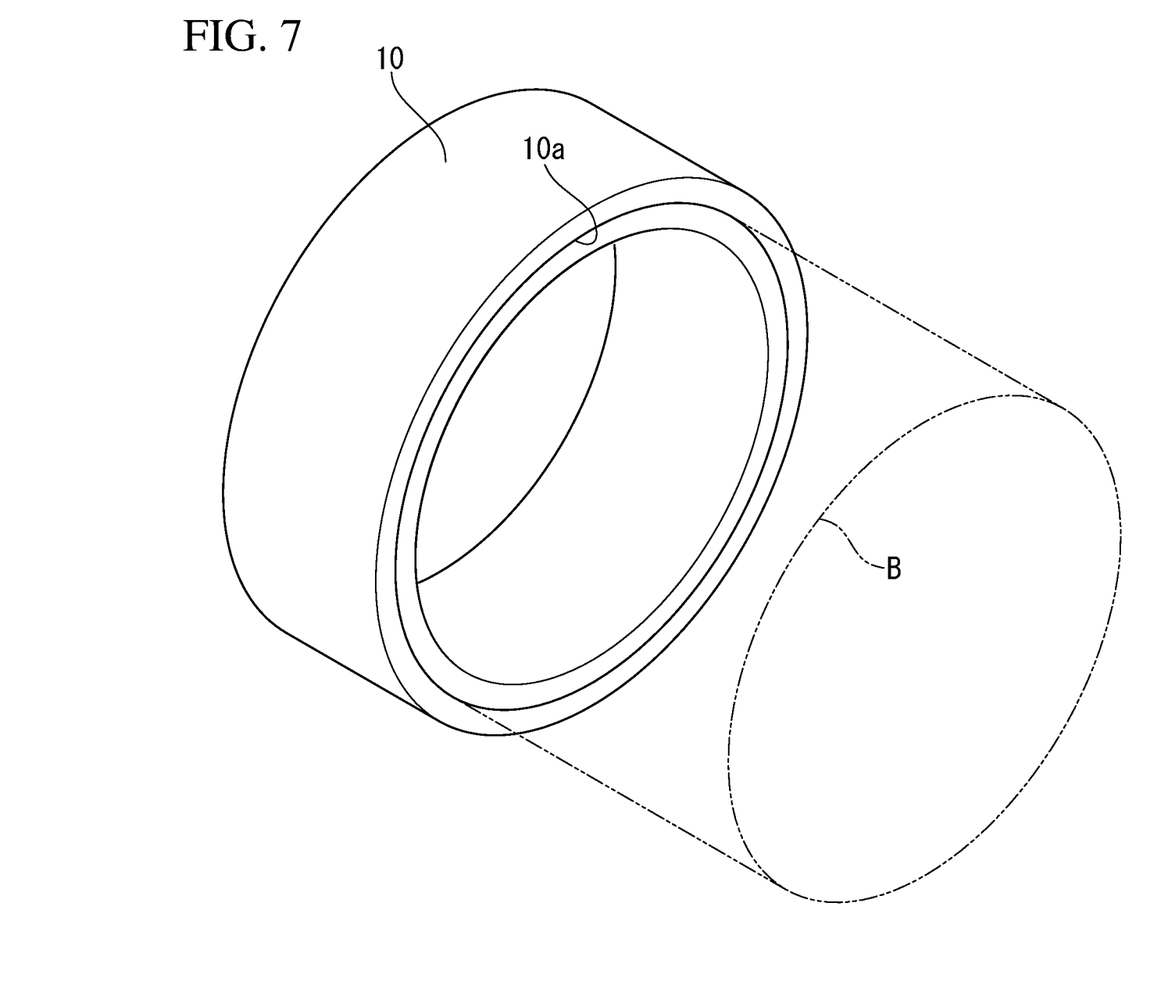
FIG. 7 is a perspective view of another modification of the airflow forming unit of the laser welding apparatus illustrated in FIG. 1.
Figure 8:
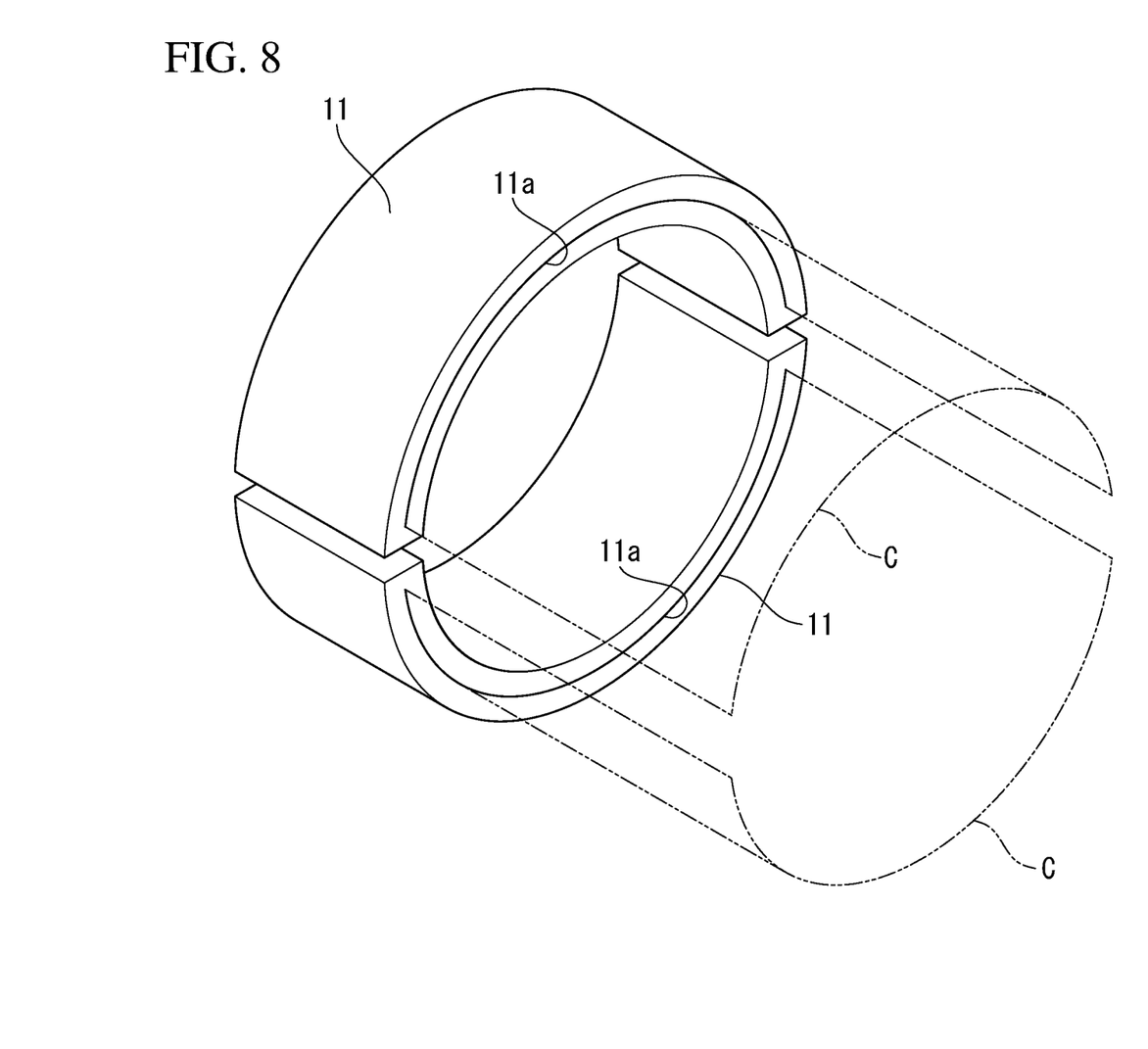
FIG. 8 is a perspective view of another modification of the airflow forming unit of the laser welding apparatus illustrated in FIG. 1.

For example, as illustrated in FIG. 7, a cylindrical airflow that surrounds the opening 9 can be formed by generating a curved or bent sheet-shaped airflow B by using an emission nozzle 10 that has a single circular emission port 10a. Alternatively, as illustrated in FIG. 8, a similar cylindrical airflow can be formed by generating two curved or bent sheet-shaped airflows C by using two emission nozzles 11 that respectively have two half-arc-shaped emission ports 11a. The tube-shaped airflow is not limited to a cylindrical airflow, and may have any other shape.

Figure 9:
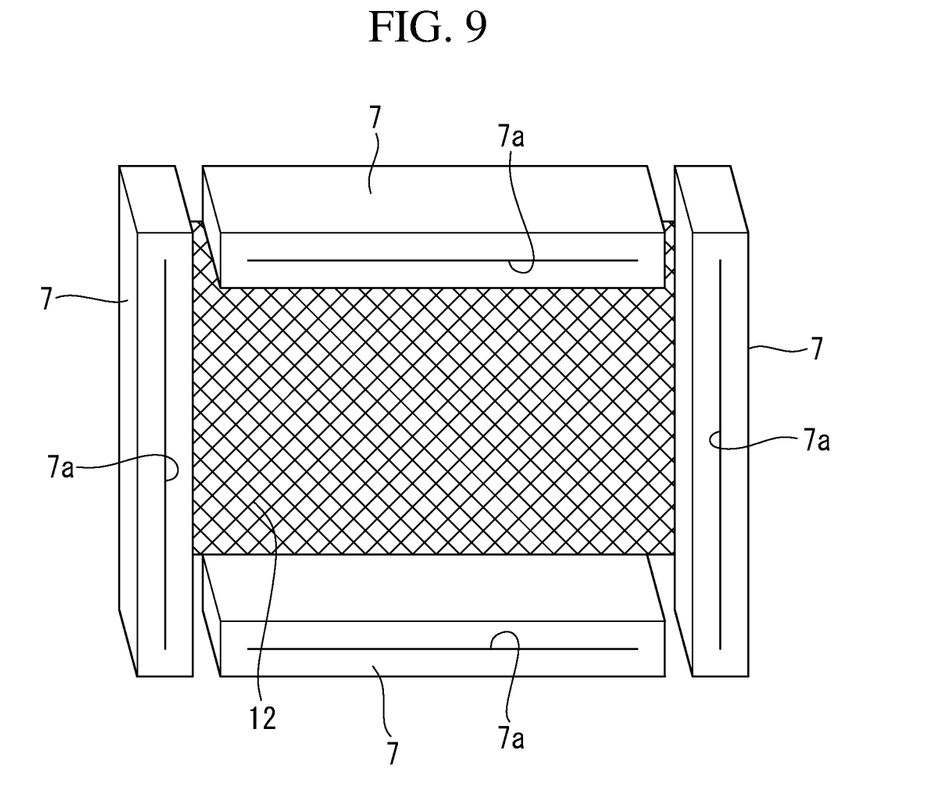
FIG. 9 is a perspective view of a modification in which a filter is attached to the airflow forming unit illustrated in FIG. 4.

As illustrated in FIG. 9, in this embodiment, a dust collecting filter 12 that can pass air and catch dust may be disposed so as to cover the opening 9. Due to the Coandă effects generated by the sheet-shaped airflows A, the air around the airflows A is entrained, and, thus, the fumes can be captured as the floating fume-containing air is entrained into the dust collecting filter 12.

That is, although spattering and fumes are efficiently removed from the optical path of the laser beam due to the airflow having a large air volume formed by the airflow forming unit 3, most of the removed dust still floats in the air. Providing the dust collecting filter 12 in the opening 9 offers an effect in that the dust in the air can be collected without separately providing a dust collecting device.

The dust collecting filter 12 may be formed of any material such as a non-woven fabric. In addition, the dust collecting filter 12 may be detachably attached to the opening 9 so that the dust collecting filter 12 that has collected dust can be easily detached from the opening 9 and replaced.

The invention claimed is:

1. A laser welding apparatus comprising:
    a laser head that emits a laser beam; and
    an airflow forming unit including an emission nozzle that forms sheet-shaped airflows,
    wherein the sheet-shaped airflows formed by the airflow forming unit traverse an optical path of the laser beam emitted from the laser head, the airflows traversing the optical path at a plurality of positions which are spaced from each other in a direction along the optical path in a same direction, and
    the airflow forming unit has an opening between the sheet-shaped airflows at the plurality of positions, the opening penetrating in a direction in which the sheet-shaped airflows traverse the optical path, wherein the emission nozzle is positioned to surround the opening.

2. The laser welding apparatus according to claim 1, wherein the airflow forming unit includes two emission nozzles that form the sheet-shaped airflows, and the two emission nozzles are positioned to surround the opening.

3. The laser welding apparatus according to claim 1, wherein the airflow forming unit includes two emission nozzles that form the sheet-shaped airflows and one or more further emission nozzles each of which forms a further sheet-shaped airflow, and the two emission nozzles and the one or more further emission nozzles are positioned to surround the opening.

4. The laser welding apparatus according to claim 1, wherein:
    the airflow forming unit includes a plurality of emission nozzles that form the sheet-shaped airflows, and
    the emission nozzles are positioned to flank the opening.

5. The laser welding apparatus according to claim 1, further comprising a dust collecting filter that is disposed in the opening.

6. The laser welding apparatus according to claim 1, wherein the airflow forming unit forms at least two of the sheet-shaped airflows that are parallel to each other.

7. A laser welding apparatus comprising:
    a laser head that emits a laser beam; and
    an airflow forming unit including an emission nozzle that forms sheet-shaped airflows, wherein at least one sheet-shaped airflows formed by the airflow forming unit orthogonally traverses an optical path of the laser beam emitted from the laser head and at least one sheet-shaped airflow traverses an area parallel to or oblique to the optical path of the laser beam, wherein the sheet shaped airflows are disposed at a plurality of positions along the optical path, and the airflow forming unit has an opening between the sheet-shaped airflows at the plurality of positions, the opening penetrating in a direction in which the airflows traverse the optical path, wherein the emission nozzle is positioned to surround the opening.

* * * * *